United States Patent [19]

Bergstedt

[11] Patent Number: 4,694,286

[45] Date of Patent: Sep. 15, 1987

[54] APPARATUS AND METHOD FOR MODIFYING DISPLAYED COLOR IMAGES

[75] Inventor: Gar A. Bergstedt, Portland, Oreg.

[73] Assignee: Tektronix, Inc., Beaverton, Oreg.

[21] Appl. No.: 483,354

[22] Filed: Apr. 8, 1983

[51] Int. Cl.[4] .............................................. G09G 1/16
[52] U.S. Cl. .................................... 340/703; 340/709; 340/724
[58] Field of Search ............... 340/701, 703, 709, 712, 340/711, 724

[56] References Cited

U.S. PATENT DOCUMENTS

| | | | |
|---|---|---|---|
| 3,846,826 | 11/1974 | Mueller | 340/703 X |
| 4,180,805 | 12/1979 | Burson | 340/724 X |
| 4,200,867 | 4/1980 | Hill | 340/724 X |
| 4,232,311 | 11/1980 | Agneta | 340/703 |
| 4,367,464 | 1/1983 | Kurahashi et al. | 340/703 X |
| 4,379,292 | 4/1983 | Minato et al. | 340/703 X |
| 4,386,345 | 5/1983 | Narveson et al. | 340/703 |
| 4,437,092 | 3/1984 | Dean et al. | 340/703 |
| 4,467,322 | 8/1984 | Bell et al. | 340/701 |

*Primary Examiner*—Marshall M. Curtis
*Attorney, Agent, or Firm*—Robert S. Hulse

[57] ABSTRACT

An apparatus and method are disclosed which permit selection of colors for display, and easy modification of displayed colors. The apparatus includes a microprocessor, a ROM with a stored program, a RAM with midifiable color data a CRT display for displaying color images, and a keyboard with a cursor-positioning key for identifying a pixel of a displayed color image, and a color menu and H (hue), L (lightness), S (saturation) color modification keys. In response to actuation of one or more of the color modification keys, the microprocessor, under control of the stored program, modifies the stored color data, and uses the modified color data to control the color guns (red, green, blue) of the CRT to modify the color of the identified pixel.

7 Claims, 10 Drawing Figures

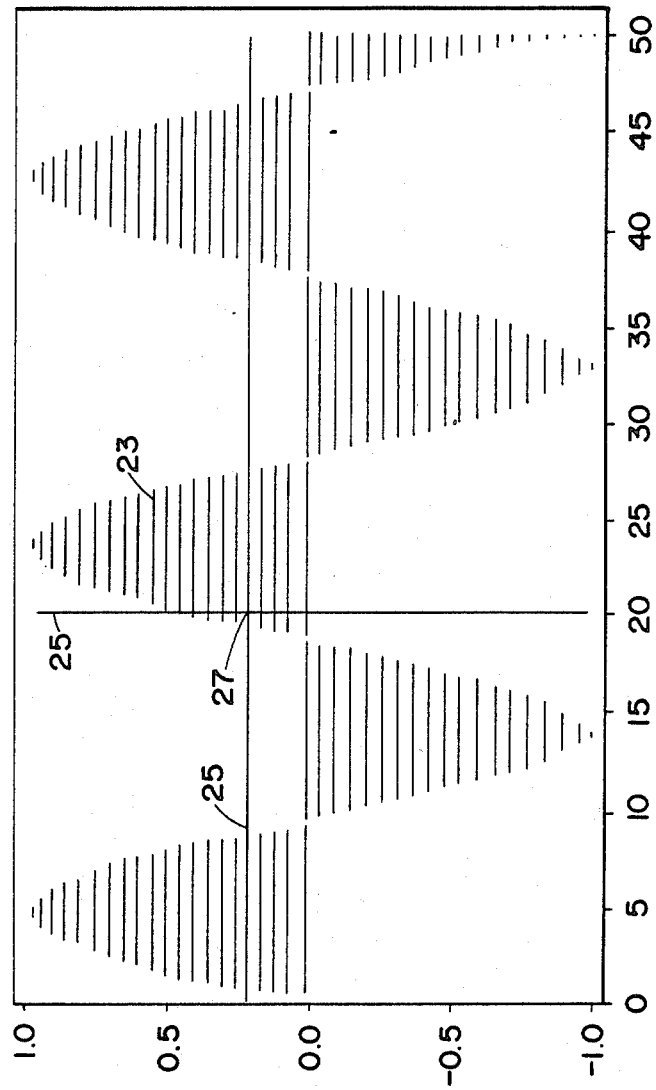

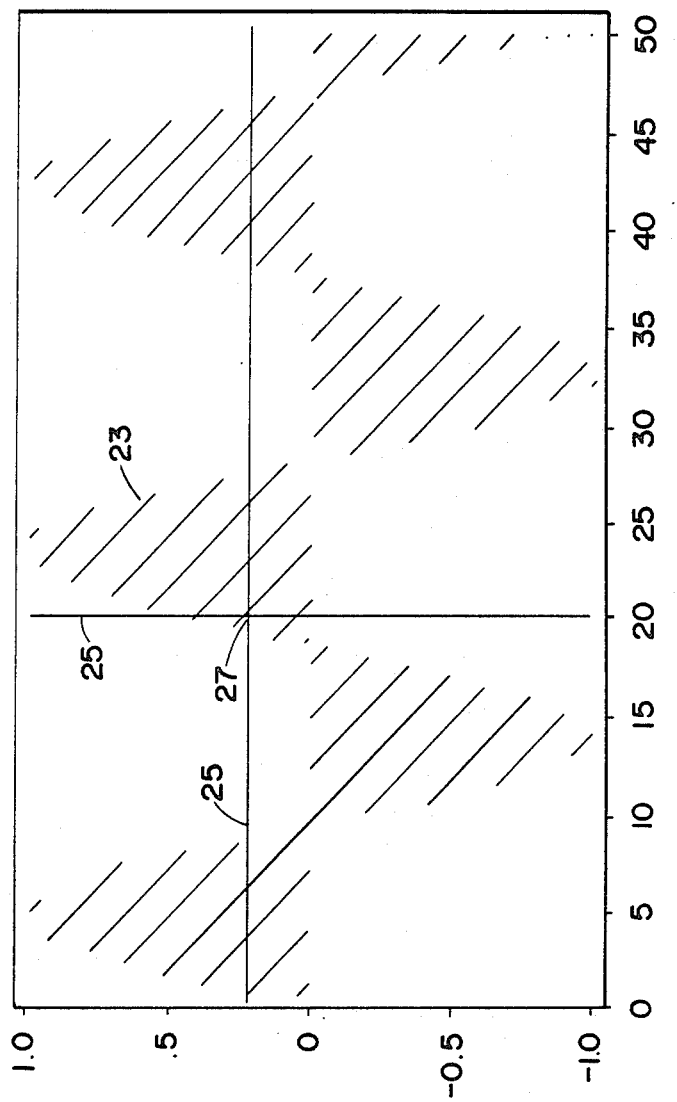

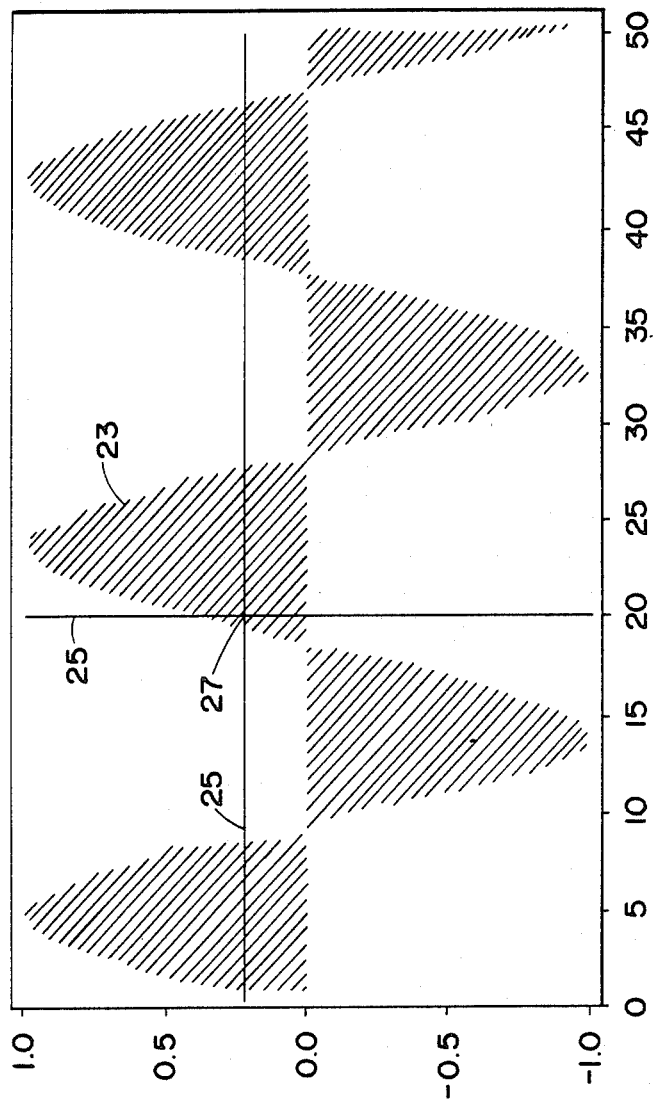

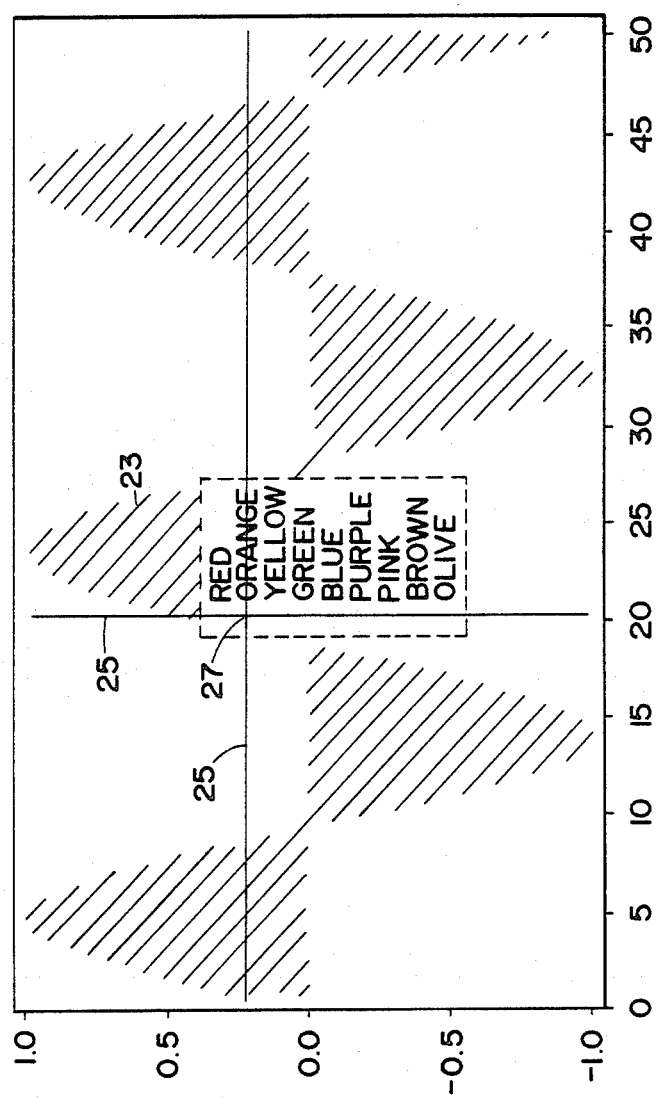

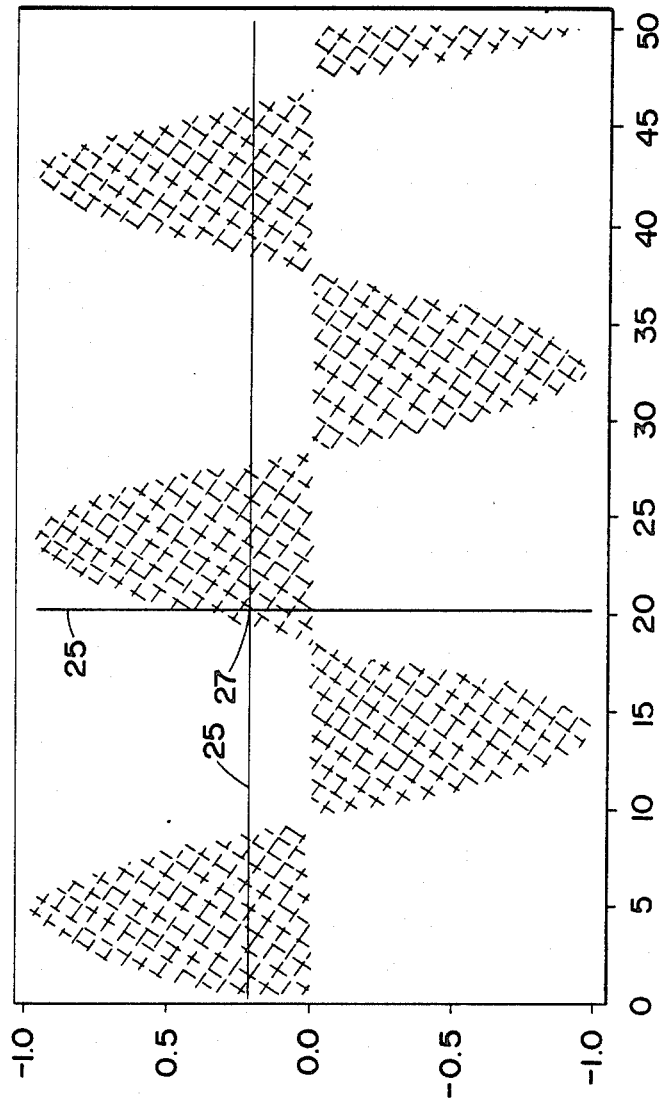

APPARATUS AND METHOD FOR MODIFYING DISPLAYED COLOR IMAGES

BACKGROUND OF THE INVENTION

This invention relates generally to color display systems, and more particularly to color-selective graphic display terminals.

Many currently available display terminals require users to have a thorough understanding of color theory and how colors combine, and to enter substantial amounts of data before a desired color may be displayed. For example, one such terminal is the Megatek 1650 graphic terminal manufactured by Megatek Corporation of San Diego, Cal., U.S.A. To specify a color index and selected color coordinates (i.e., selected amounts of red, green, and blue base colors from which a resultant color or index is to be formed), such terminals often require the entry of four data values to specify the color index, followed by the entry of three more data values to specify the color coordinates; and even when the user satisfies these requirements, the specified color is often not displayed when its index is different from that of a previous image. To avoid this problem, the user often has to enter a display command; and, to do this, he is required to specify a color polygon, then build the polygon, coordinate by coordinate, superimposing the selected (desired resultant) color on the polygon—a multistep, often laborious process.

What is needed and would be useful, therefore, is a color selection and display apparatus which simplifies the process of color selection/specification.

SUMMARY OF THE INVENTION

Accordingly, an apparatus is provided which permits easy selection of colors for display, and easy modification of displayed colors. In accordance with the illustrated preferred embodiment of the present invention, the apparatus comprises a keyboard, a microprocessor, a ROM (read-only memory) with a stored program, a RAM (random-access memory) with predetermined, changeable color data, and a CRT (cathode ray tube) display for displaying color images. The keyboard includes a color menu key for initiating the display of a color menu, a disk key for selecting a color name from the menu or for specifying an image segment whose color is to be modified, and H (hue), L (lightness), S (saturation) keys for entering color modification data. In response to actuation of one or more of said keys, the microprocessor, under control of the stored program, modifies the color data and uses the modified color data to control the color (red, green, blue) guns of the CRT to produce a desired resultant color display.

BRIEF DESCRIPTION OF THE DRAWINGS

FIG. 6 is a graphic representation of the color image of FIG. 2 with the hue coordinate modified;

FIG. 7 is a graphic representation of the color image of FIG. 2 with the lightness coordinate modified;

FIG. 8 is a graphic representation of the color image of FIG. 2 with the saturation coordinate modified;

FIG. 9 is a graphic representation of the color image of FIG. 2 including a color menu; and FIG. 10 is a graphic representation of the color image of FIG. 2 modified in accordance with selection of the orange color from the color menu of FIG. 9.

DESCRIPTION OF THE PREFERRED EMBODIMENT

Figure 1:
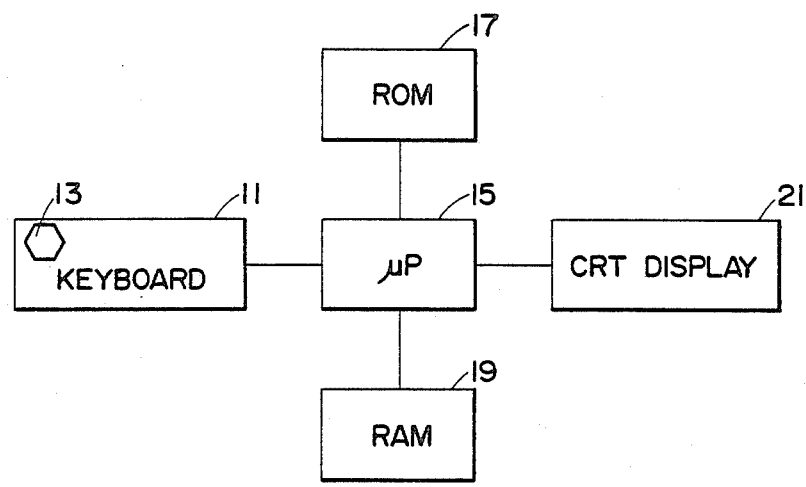
FIG. 1 is a block diagram of the apparatus of the present invention.

Referring to FIG. 1, there is shown a system (apparatus) of the present invention comprising an alphanumeric keyboard 11 with cursor-positioning key or disk 13, microprocessor 15, read-only memory 17 for storing system control programs, random access memory 19 for storing variables such as color data, and CRT raster scan display 21 for displaying color in accordance with selected ones of the stored color data.

Figure 2:
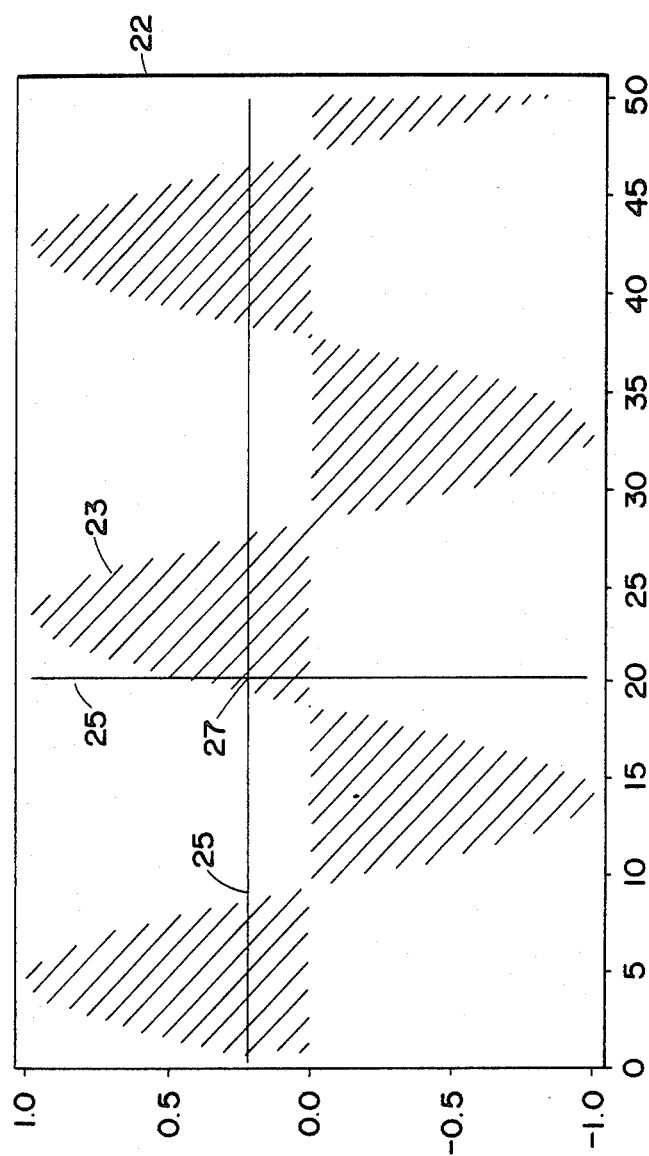
FIG. 2 is a graphic representation of an initial color image displayed by the apparatus of FIG. 1.

FIG. 2 shows a graphic image, in color (e.g., medium green), displayed on screen 22 of CRT display 21. To change the color of a segment (e.g., segment 23) of the image, the user of the system first positions cursor 25 at a pixel 27 (picture element) or portion of the segment to be changed, then actuates (depresses and releases) one or more of the hue, lightness, and saturation keys 29, 31, 33, respectively of keyboard 11 shown in FIG. 3. Cursor positioning is accomplished by actuation of disk key 13.

Figure 4:
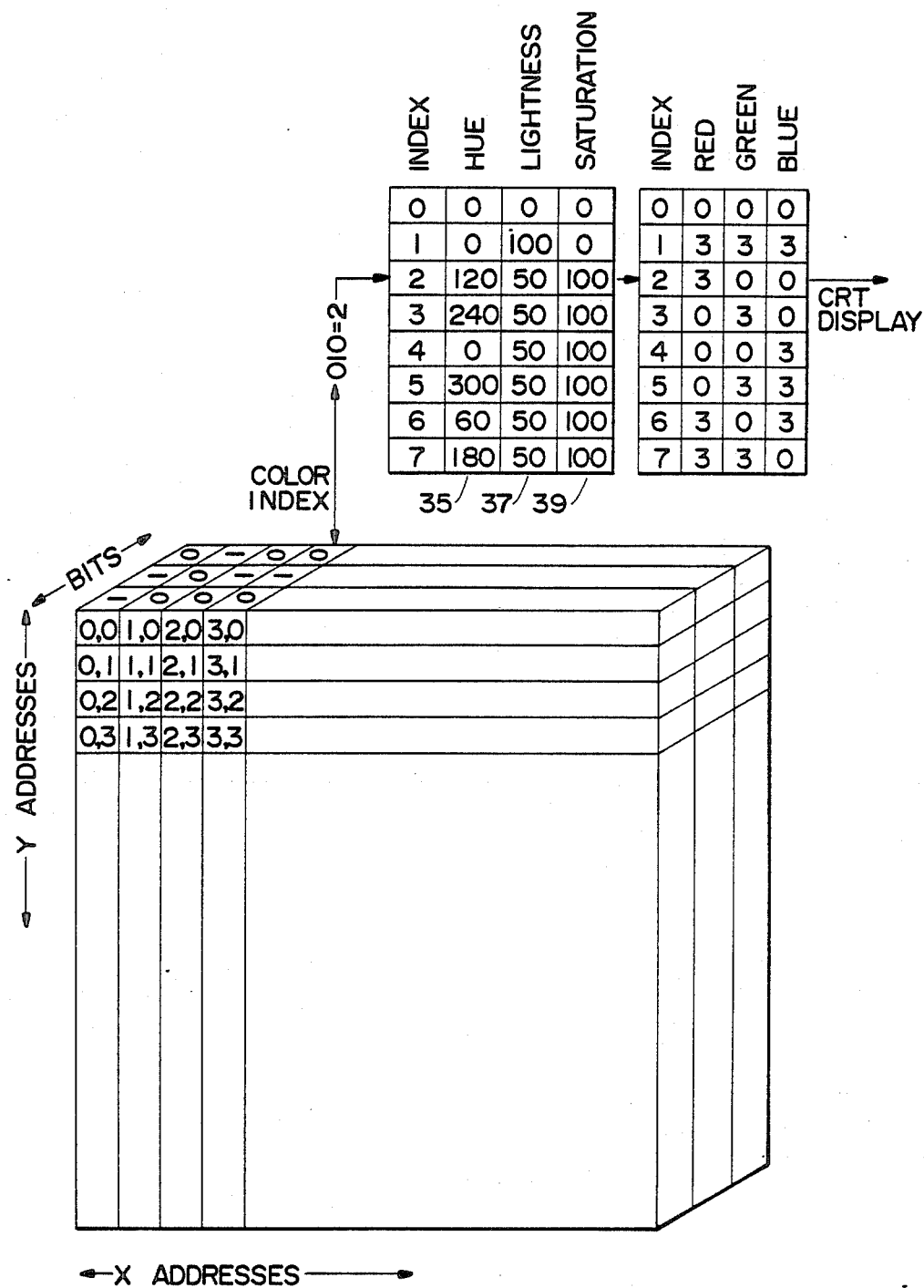
FIG. 4 is a graphic representation of a bit map arrangement of modifiable color data initialized by the apparatus of FIG. 1.
Figure 5:
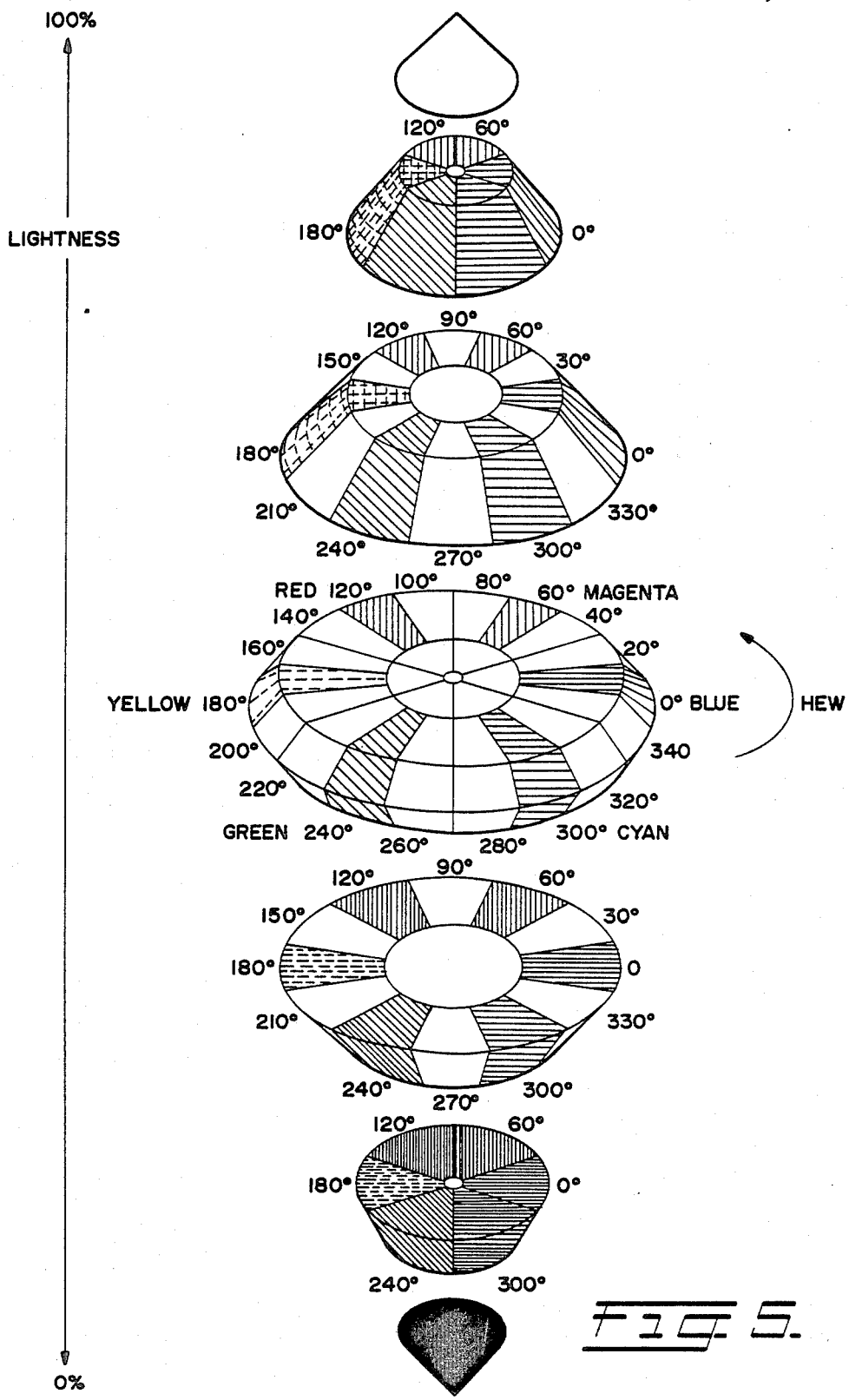
FIG. 5 is an exploded view of a color model having hue, lightness, and saturation coordinates corresponding to selected ones of the modifiable color data.

A color index is associated with each pixel. If the screen 22 is represented by an X-Y matrix of 480×360 pixels, for example, there will be correspondingly 172,800 indexes, one index associated with each pixel. An index is a series of bits which is used to address (point to) color coordinate values stored in RAM 19. For example, a series of three bits may be used to denote indexes 0-7, each index representing the starting address of a group of three color coordinate words 35, 37, 39, as shown in FIG. 4. The contents of the first, second, and third words 35, 37, 39 of each group represents hue data, lightness data, and saturation data, respectively, for the associated index. The hue, lightness, and saturation data correspond to spatial (angular, vertical, radial) coordinates of an HLS (hue, lightness, saturation) color cone as shown in FIG. 5. Upon successive actuations of hue key 29, the color of the image segment at cursor position 27, and all other segments having the same color index, is changed discretely (e.g., each actuation corresponding to a 20° change) in a clockwise manner around the cone (i.e. 0 to 360 degrees) as shown in FIG. 5. For example, when hue key 29 is actuated three times from the hue value of 240° shown in FIG. 2, the hue value is changed from 240° to 300°, causing the color of all image segments having the same index as that of the pixel at the middle green color of FIG. 2 to change to the cyan color of FIG. 6. Likewise, upon successive actuations of lightness key 31, the color of the image segment at cursor position 27, and all other segments having the same color index, is changed discretely (e.g., each actuation corresponding to a 10% change) from 0% to 100% vertically up the cone as shown in FIG. 5. From 100%, further actuation of key 31 causes color lightness to start varying again from 0% (black) toward 100% (white). For example, when lightness key 31 is actuated three times from the lightness value of 50% shown in FIG. 2, the lightness value is changed from 50% to 80%, causing the color of all image segments having the same index as that of the pixel at cursor position 27 to change from the medium light green color of FIG. 2 to the lighter green color of FIG. 7. Similarly, upon successive actuations of saturation key 33, the color of the image segment at cursor position 27, and all other segments having the same color index, is changed discretely (e.g., each actuation corresponding to a 25% change) from 0% at the axis of the cone to 100% toward the periphery of the cone, as shown in FIG. 5. From 100%, further actuation of key 33 causes color saturation to start varying again from 0% (no saturation) toward 100% (maximum saturation). For example, when saturation key 33 is actuated twice from the saturation value of 100% shown in FIG. 2, the saturation value is changed from 100% to 0% to 25%, causing the color of all image segments having the same index as that of the pixel at cursor position 27 to change from the maximum saturated green color of FIG. 2 to less saturated green color of FIG. 8.

Whenever the hue, lightness, and saturation values are changed for a given index (e.g., for the index three associated with the pixel at cursor position 27 shown in FIGS. 2 and 6 to 8) because of actuation of the hue, lightness and saturation keys 29, 31 and 33, the changed values are stored as new hue, lightness and saturation coordinate values in words 35, 37, and 39 for that index. As shown in FIGS. 2 and 6–8, the coordinate values and associated index indicative of a particular color are displayed for the user's convenience if the user wishes to specify the same color at a later time. To do so, the user merely enters, via keyboard 11, the coordinates and index for that color.

Figure 3:
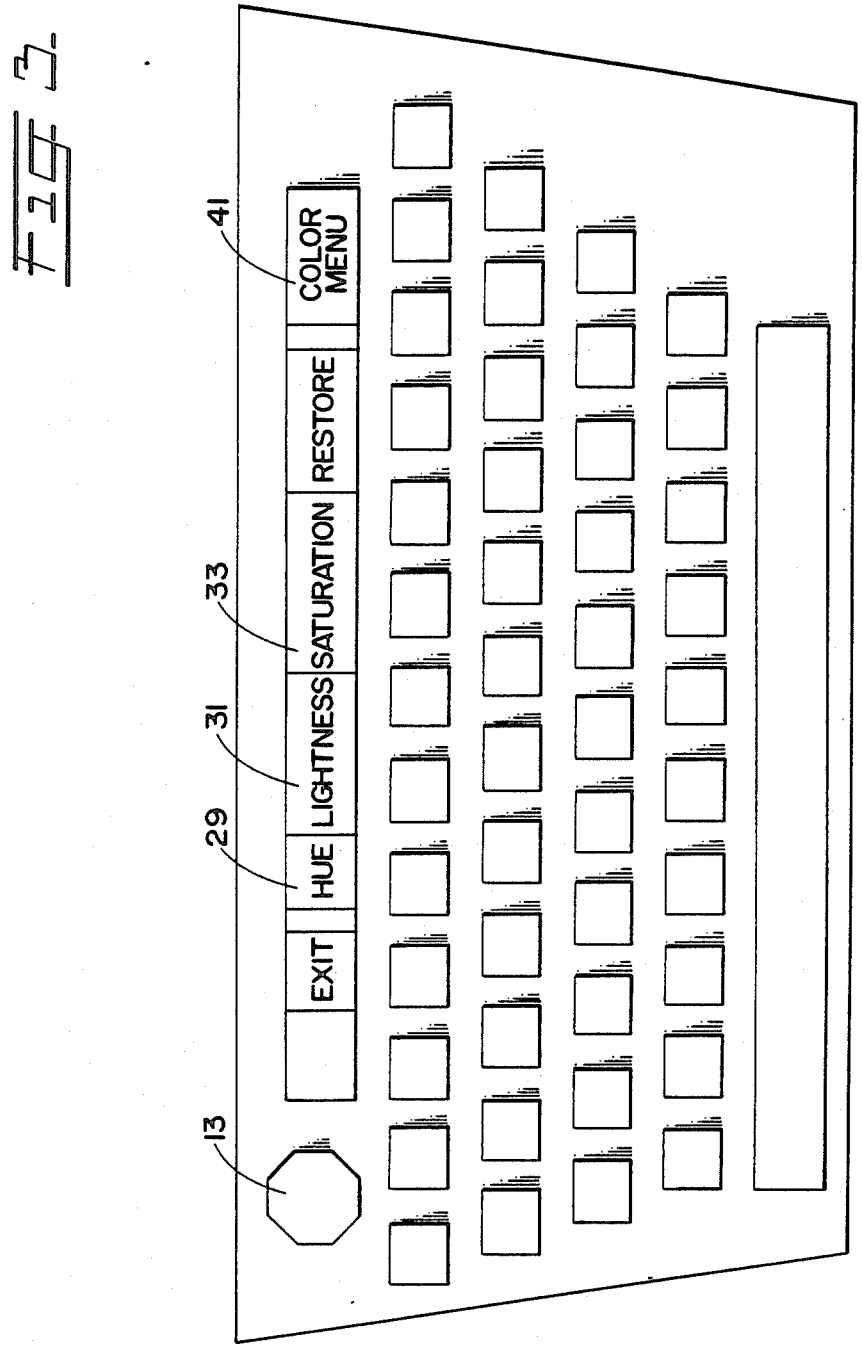
FIG. 3 is a top view of a keyboard of the apparatus of FIG. 1.

The foregoing represents one method of changing color of image segments. The following represents another method, utilizing a color menu. Referring to FIG. 2, there is shown a displayed image with cursor positioned at a pixel 27, the color of which pixel 27 (and associated segment 23) the user desires to change. FIG. 3 shows keyboard 11 having a color menu key 41. Upon depression of key 41, a color menu 43 is displayed at a predetermined distance proximate to the cursor. To select a color from the menu and to have the color of the pixel at which the cursor is positioned change to the selected color, the user simply moves the cursor, by repeated actuations of disk key 13, and positions it on the menu color of his choice as shown, for example, in FIG. 9. Thereafter, upon release of color menu key 41, the color of the pixel (and of all image segments having the same color index as that of the pixel) is changed to the color selected from the menu, and display of the menu is terminated, as shown in FIG. 10. Each color of the menu is represented by three HLS color coordinate values. These coordinate values, which are predetermined, are stored in ROM 17.

Thus, the color menu key and the HLS keys may be viewed as color modification devices. After the HLS coordinate values are changed in response to actuation of one of the HLS keys, or actuation of the color menu key, the changed values are converted by known methods to RGB (red, green, blue) values which are used by the CRT display to regulate the output of its RGB guns.

I claim:

1. An apparatus for modifying color characteristics of a displayed color image formed by a plurality of pixels, the apparatus comprising:
    means for storing pixel color data, including index values and sets of hue (H), lightness (L) and saturation (S) color values, each index value associating one color, represented by one set of H, L, S color values, with at least one pixel;
    means for selecting a color of the image for modification by positioning a cursor at a specified pixel having that selected color; and
    means for modifying at least one of the set of H, L, S color values associated with the specified pixel in response to input of new color data, said modifying means including a means for inputting new color data for at least one of said set and a processor means responsive to the new color data for changing said at least one of the set of stored H, L, S color values to the new color data, enabling color modification, according to the modified set, of all pixels of the image having the same index value as the specified pixel.

2. An apparatus as recited in claim 1 wherein the input means includes a means for entering index values.

3. An apparatus as recited in claim 1 wherein the input means is a keyboard with a plurality of keys including H, L, S keys for entering H, L, S color values for specified pixels, each value being changeable by a predetermined discrete amount upon each actuation of the respective H, L, S key.

4. An apparatus as recited in claim 1 wherein the input means includes:
    a menu key, in response to actuation of which a menu of color items is displayed; and wherein the cursor is positionable at an item of the menu for selecting a color from the menu for display.

5. A method for modifying selected colors of a displayed color image formed by a plurality of pixels, the method comprising the steps of:
    selecting a color of the image to be changed, by positioning a cursor at a selected pixel having that color, each pixel having an index associated with one set of a plurality of sets of stored hue (H), lightness (L), and saturation (S) color values;
    inputting at least one new color value; and
    changing at least one of the stored H, L, S color values of the set associated with the particular index of the selected pixel, enabling the color of all pixels having said particular index to be changed to the color corresponding to the set of changed color values.

6. A method as recited in claim 5 wherein said inputting step comprises the step of actuating at least one input key for entering hue, lightness, and saturation color values.

7. A method as recited in claim 5 wherein said inputting step includes the steps of displaying a menu of colors and selecting a color from the menu.

* * * * *